United States Patent
Lee et al.

(10) Patent No.: US 11,010,572 B2
(45) Date of Patent: May 18, 2021

(54) DEVICE AND METHOD FOR TESTING RF INTEGRATED CIRCUIT IN WIRELESS COMMUNICATION SYSTEM

(71) Applicant: Samsung Electronics Co., Ltd., Gyeonggi-do (KR)

(72) Inventors: Sangho Lee, Gyeonggi-do (KR); Seokhyeon Kim, Gyeonggi-do (KR); Donggyu Minn, Gyeonggi-do (KR); Youngchang Yoon, Gyeonggi-do (KR); Juho Son, Gyeonggi-do (KR); Kyuhwan An, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/728,651

(22) Filed: Dec. 27, 2019

(65) Prior Publication Data

US 2020/0210658 A1    Jul. 2, 2020

(30) Foreign Application Priority Data

Dec. 27, 2018   (KR) ..................... 10-2018-0171168

(51) Int. Cl.
  *G06K 7/10*       (2006.01)
  *G06K 19/07*      (2006.01)
  *G06K 7/00*       (2006.01)
  *G06K 19/077*     (2006.01)

(52) U.S. Cl.
  CPC ....... *G06K 7/10366* (2013.01); *G06K 7/0008* (2013.01); *G06K 7/0095* (2013.01); *G06K 19/0723* (2013.01); *G06K 19/07752* (2013.01)

(58) Field of Classification Search
  CPC ...................................................... G06K 7/10
  See application file for complete search history.

(56) References Cited

U.S. PATENT DOCUMENTS

| | | | |
|---|---|---|---|
| 8,085,059 B2 | 12/2011 | Ko et al. | |
| 10,110,325 B2 | 10/2018 | Chen et al. | |
| 2003/0194001 A1* | 10/2003 | Barksdale, Jr. | H04B 17/104 375/229 |
| 2011/0227601 A1 | 9/2011 | Hashimoto et al. | |
| 2013/0201006 A1* | 8/2013 | Kummetz | G06K 7/10267 340/10.1 |
| 2014/0335805 A1* | 11/2014 | Briffa | H03F 1/02 455/127.3 |
| 2018/0285568 A1 | 10/2018 | Finger | |
| 2019/0028137 A1* | 1/2019 | O'Neill | H04B 1/44 |

\* cited by examiner

*Primary Examiner* — Nabil H Syed
*Assistant Examiner* — Cal J Eustaquio
(74) *Attorney, Agent, or Firm* — The Farrell Law Firm, P.C.

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). An electronic device and an operation method thereof are provided for testing performance of a radio frequency integrated circuit (RFIC) in a wireless communication system. The method includes checking a connection state of elements operable as combiners and a plurality of RF chains of the RFIC; performing control to output RF signals from the plurality of RF chains; acquiring an integrated signal by combining the RF signals via the combiners; and determining a quality indicator for the RFIC based the integrated signal.

16 Claims, 12 Drawing Sheets

DEVICE AND METHOD FOR TESTING RF INTEGRATED CIRCUIT IN WIRELESS COMMUNICATION SYSTEM

CROSS-REFERENCE TO RELATED APPLICATION(S)

This application is based on and claims priority under 35 U.S.C. § 119 to Korean Patent Application No. 10-2018-0171168, filed on Dec. 27, 2018, in the Korean Intellectual Property Office, the entire disclosure of which is incorporated herein by reference.

BACKGROUND

1. Field

The disclosure relates generally to a wireless communication system and, more specifically, to a device and method for testing a radio frequency (RF) integrated circuit (IC) in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In manufacturing stages of an electronic device, it is necessary to test performance of an RFIC in the electronic device. If performance is checked via measurement of signals radiated using an RFIC and an antenna, when a problem related to the performance occurs, it cannot be known exactly whether the problem was caused due to the RFIC or the antenna.

SUMMARY

The disclosure is designed to address at least the problems and/or disadvantages described above and to provide at least the advantages described below.

An aspect of the disclosure is to provide a device and method for testing an RFIC in a wireless communication system.

Another aspect of the disclosure is to provide a device and method for measuring performance of an RFIC without connecting an antenna to each RF chain of the RFIC in a wireless communication system.

Another aspect of the disclosure is to provide a device and method for coupling an RFIC with a combiner in order to determine performance of the RFIC in a wireless communication system.

In accordance with an aspect of the disclosure, a test board is provided for use in a wireless communication system. The test board includes a socket for coupling with a radio frequency integrated circuit (RFIC); a connector for coupling with a spectrum analysis device; and a plurality of combiners configured to combine RF signals. A plurality of RF chains of the RFIC are respectively connected to a plurality of input ends of the plurality of combiners.

In accordance with another aspect of the disclosure, a method is provided for testing performance of an RFIC in a wireless communication system. The method includes checking a connection state of combiners and a plurality of RF chains; performing control to output RF signals from the plurality of RF chains; acquiring an integrated signal by combining the RF signals via elements operable as the combiners; and determining a quality indicator for the RFIC based on the integrated signal.

In accordance with another aspect of the disclosure, an electronic device is provided for use in a wireless communication system. The electronic device includes a processor configured to check a connection state of elements operable as combiners and a plurality of RF chains of a radio frequency integrated circuit (RFIC); perform control to output RF signals from the plurality of RF chains; acquire an integrated signal by combining the RF signals via the combiners; and determine a quality indicator for the RFIC based on the integrated signal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments will be described based on an approach of hardware. However, various embodiments include a technology that uses both hardware and software and thus, the various embodiments may not exclude the perspective of software.

The disclosure relates to a device and method for measuring a quality of an RFIC in a wireless communication system. Specifically, the disclosure describes a technique for measuring a quality of an RFIC by a combiner, without designing an antenna, in a wireless communication system.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings identical or similar to the contextual meanings in the relevant field of art, and are not to be interpreted to have ideal or excessively formal meanings unless clearly defined in the disclosure. In some cases, even the term defined in the disclosure should not be interpreted to exclude embodiments.

The terms referring to quality-related parameters (e.g., performance, indicator, quality, error rate, success rate, intensity, etc.) used in the following descriptions, and the terms referring to elements of the device (e.g., -er/or and -unit), etc., are illustrated for the convenience of description. Accordingly, the disclosure is not limited to the following terms and other terms having the same technical meaning may be used. Measuring performance may be expressed in a variety of ways, such as measuring quality, determining a quality indicator, and acquiring a parameter value for quality.

In the disclosure, the expression "equal to or greater/more/larger than", or "greater/more/larger than or equal to", or "equal to or smaller/less than", or "smaller/less than or equal to" may be used to determine the number or to determine whether a certain condition is fulfilled. However, this is merely an example for description of an embodiment, and does not exclude description of "exceeding" or "smaller/less than". A condition stated as "equal to or greater/more than" may be replaced with "exceeding", a condition stated as "equal to or smaller/less than" may be replaced with "smaller/less than" and a condition state as "equal to or greater/more than, and less than" may be replaced with "exceeding, and equal to or smaller/less than".

Figure 1:
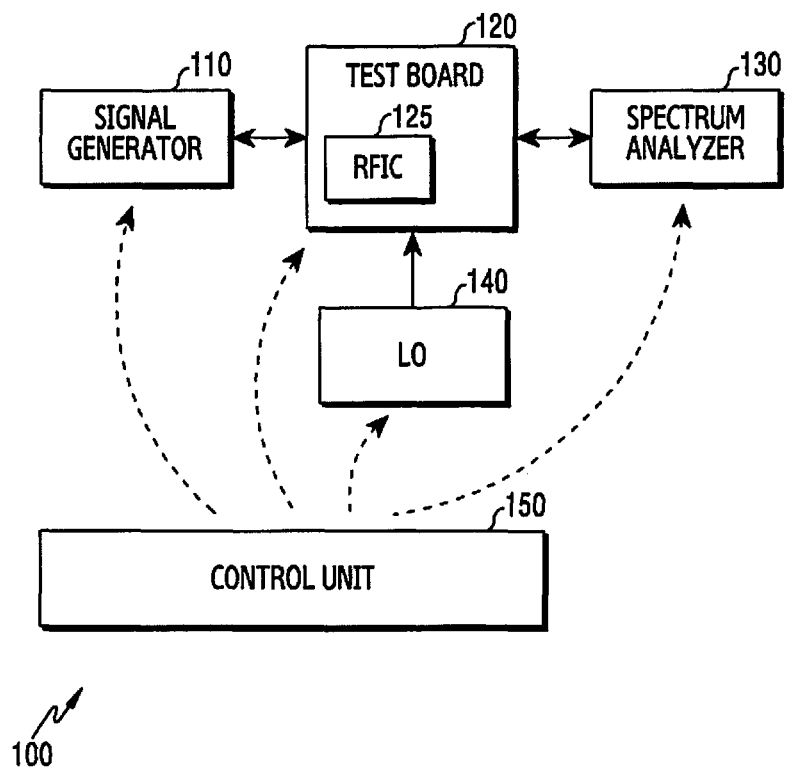
FIG. 1 illustrates a test environment according to an embodiment.

FIG. 1 illustrates a test environment according to an embodiment. For example, a test environment 100 may be an environment for measuring and analyzing performance of an RFIC.

Referring to FIG. 1, the test environment 100 includes a signal generator 110, a test board 120, a spectrum analyzer 130, a local oscillator (LO) 140, and a control unit 150. An RFIC 125 is mounted on the test board 120.

The signal generator 110 may generate a test signal. The signal generator 110 may be operatively coupled to the test board 120 and the RFIC 125. In order to measure transmission performance of the RFIC 125, the signal generator 110 may provide the RFIC 125 with a generated test signal. The signal generator 110 may generate an IF signal as a test signal, and the generated IF signal may be transferred to the RFIC 125. The IF signal may be converted to an RF signal via mixers of the LO 140 and RFIC 125, and may be output from the RFIC 125. The test signal (e.g., an output RF signal) may be provided to a measurement device (e.g., the spectrum analyzer 130) via the test board 120. In order to measure reception performance of the RFIC 125, the signal generator 110 may provide the test board 120 with a generated test signal.

The signal generator 110 may generate an RF signal as a test signal, and the generated RF signal may be transferred to the test board 120. The RF signal may be transferred to the RFIC 125 via the test board 120, and the RFIC 125 may down-convert the received RF signal to an IF signal. The test signal transferred to the RFIC 125 may be provided to a measurement device (e.g., the spectrum analyzer 130).

The test board 120 may provide an environment for measuring performance of the RFIC 125. The test board 120 may provide a circuit environment in which a signal acquired from the RFIC 125 is provided via a measurement device (e.g., the spectrum analyzer 130). The test board 120 may include a socket for connection to the RFIC 125. The RFIC 125 may be coupled to the test board 120 via the socket of the test board 120. The RFIC 125 may be mounted on the test board 120. The test board 120 may include a connection unit for connecting to a plurality of RF chains of the RFIC 125. The connection unit may include at least one combiner.

The RFIC 125 may perform RF signal transmission and/or RF signal reception. The RFIC 125 may include an up-conversion mixer, a down-conversion mixer, a power amplifier, and a low noise amplifier (LNA). The RFIC 125 may acquire a baseband signal or an intermediate frequency (IF) signal and up-convert the acquired signal so as to transmit an RF signal. Alternatively, the RFIC 125 may receive an RF signal and down-convert the acquired RF signal so as to acquire a baseband signal or an IF signal. The RFIC 125 may support millimeter waves (mmWave). The RFIC 125 may include a plurality of RF chains (e.g., N RF chains). If the plurality of RF chains of the RFIC 125 are connected to antenna elements of an array antenna, respectively, each RF chain may form a beam.

The spectrum analyzer 130 may measure a signal received from the test board 120 or the RFIC 125. The spectrum analyzer 130 may measure the quality of the signal. The quality may be at least one of error vector magnitude (EVM), gain, noise figure, harmonic performance according to 2-tone test, linearity, bit error rate (BER), block error rate (BLER), reference signal received power (RSRP), reference signal received quality (RSRQ), received signal strength indicator (RSSI), signal to interference and noise ratio (SINR), carrier to interference and noise ratio (CINR), and/or signal to noise ratio (SNR).

Although various embodiments will be described below by using an EVM as a communication quality, other terms having equivalent technical meanings or other metrics indicating a channel quality may be used.

The spectrum analyzer 130 may be referred to as an RF instrument, a communication quality meter, an RF signal analyzer, a network analyzer, a network spectrum analyzer, a measurement device, measurement equipment, a measurement apparatus, etc.

The LO 140 may perform frequency conversion. The LO 140 may be operatively coupled to the test board 120 and the RFIC 125. The LO 140 may supply a reference frequency source to a mixer included in the RFIC 125. The LO 140 may provide a reference value for converting an IF to an RF or converting an RF to an IF.

The control unit 150 may control the signal generator 110, the test board 120, the spectrum analyzer 130, and the LO 140 to perform measurement operations according to various embodiments. The control unit 150 may check that the RFIC 125 is connected to the test board 120. Specifically, the control unit 150 may check whether the plurality of RF chains of the RFIC 125 are connected to combiners of the test board 120. The control unit 150 may control each RF chain to transmit an individual test signal, based on a signal of the signal generator 110. Each individual test signal may then pass through the combiners to form an integrated signal. The control unit 150 may acquire the integrated signal. The control unit 150 may determine a quality indicator for the RFIC 125 by measuring the integrated signal. The control unit 150 may include at least one processor or micro-processor in order to control the above described operations. The control unit 150 may be included in a personal computer (PC) or may be implemented by separate hardware connected to a PC.

The disclosure is not limited to the test environment 100 illustrated in FIG. 1. For example, as alternative to FIG. 1, each device may not be implemented as a separate device, but two or more functional elements that perform an identical function may be included in one device. For example, the signal generator 110 and the spectrum analyzer 130 may be implemented in one device, or the test board 120 and the spectrum analyzer 130 may be implemented in one device. As another example, at least one of devices included in the test environment 100 may be an instruction set or codes stored in a memory of an electronic device, i.e., instructions/codes at least temporarily resided in the control unit 150, a storage space storing instructions/codes, a part of circuitry included in the control unit 150, or a module configured to perform a function of the control unit 150. The control unit 150 may control the electronic device to perform various operations.

Alternatively, performance of the RFIC 125 may be measured without the LO 140.

With the introduction of 5th generation (5G) communication systems, the possibility of using millimeter waves is increasing. An RFIC may be combined with an antenna arrays to provide millimeter waves. In a test system for measuring the performance of a conventional RFIC, a test signal is radiated via the RFIC and the antenna array, and the test signal may be transmitted to measurement equipment via a radio channel. Because both an RFIC and antennas are used, if it is determined, via a test, that a performance problem has occurred, there is no way to know exactly whether the problem has occurred due to the RFIC or the antennas.

Mass production of a product, such as an RFIC, requires a test system that measures whether a required quality is satisfied in order to be more efficient. Therefore, the test system should measure the quality of the RFIC independently of the antenna.

Hereinafter, various embodiments describe schemes for measuring a performance of an RFIC without an antenna for over-the-air (OTA) measurement. Various embodiments of the disclosure not only shorten the overall test time by independently measuring the performance of the RFIC, but also provide an improvement in the overall set yield rate. Specifically, various embodiments provide a test method, a test board, and a test system for determining a quality indicator of an RFIC. For example, for RFIC quality measurement, a device (e.g., the control unit 150) that controls the signal generator 110, the test board 120, the spectrum analyzer 130, and the LO 140 may be understood as an embodiment. For example, the test board 120 that enables measurement of the performance of the RFIC, without a separate antenna design, may also be an embodiment.

Figure 2A:
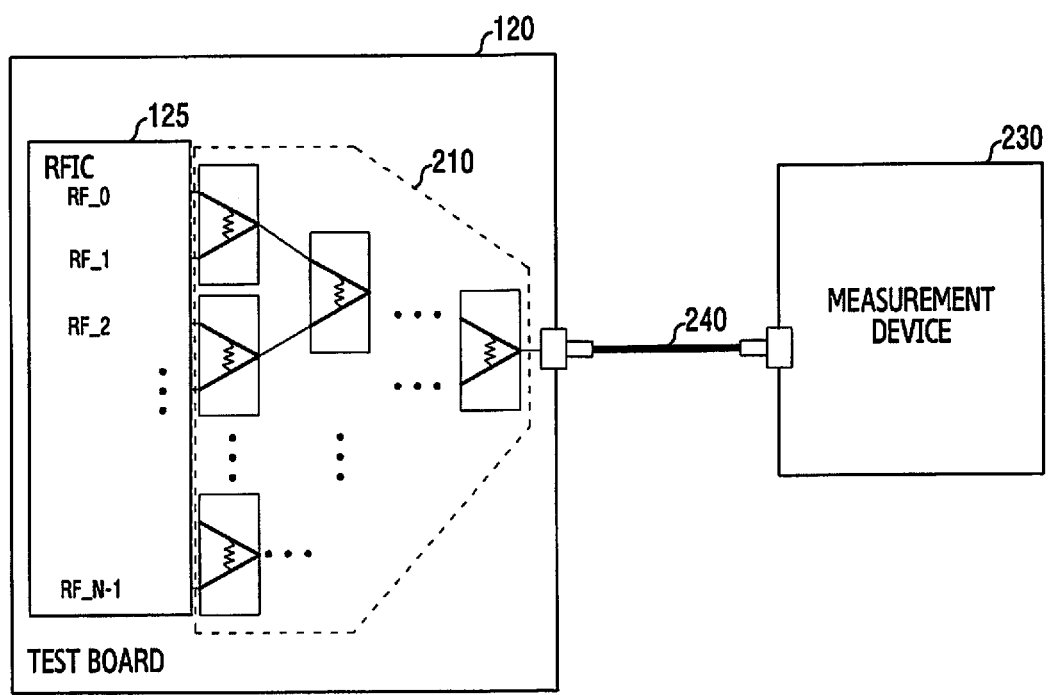
FIG. 2A illustrates a functional configuration of a test board for quality measurement of an RFIC according to an embodiment.

FIG. 2A illustrates a test board for determining a quality indicator of an RFIC according to an embodiment.

Referring to FIG. 2A, the test board 120 includes a combiner set 210. The combiner set 210 may include at least one RF combiner. The RF combiner may combine RF signals. The RF combiner may combine power of each RF signal. The RF combiner may output a signal of combined power.

The RFIC 125 mounted on the test board 120 includes a plurality of RF chains. In order to transmit an RF signal in an mmWave band, the RFIC 125 may include an RF chain for RF signal processing for each antenna when connected to an antenna array. The RF chain may include at least one of RF elements (e.g., mixer amplifier (e.g., a power amplifier (PA) and a low noise amplifier (LNA)), a filter, and a driver). The plurality of RF chains may be connected to an end of each combiner included in the combiner set 210. For example, the combiner may be a 2-in-1 combiner. If the number of the plurality of RF chains is 16, the test board 120 may include the combiner set 210 including 15 combiners.

The test board 120 may include a transmission path and/or a reception path. The transmission path may be a path for transmission of a test signal transmitted from the RFIC 125. The reception path may be a path for reception of a test signal transmitted to the RFIC 125. That is, the test board 120 may separately include combiners constituting the transmission path and combiners (distributors) constituting the reception path.

When the RFIC 125 is mounted, the test board 120 may include the combiner set 210 including combiners disposed to be connected to the plurality of respective RF chains of the RFIC 125. Each combiner may combine RF signals transmitted from the RF chains, respectively. The RF signals may be combined into one signal by passing through the combiners. Via repetition of a hierarchical structure, the RF signals may be finally formed into one integrated signal. Each stage of the hierarchical structure may be referred to as a layer. For example, if the RFIC 125 includes 16 RF chains, a first layer may include 8 combiners, a second layer may include 4 combiners, a third layer may include 2 combiners, and a fourth layer may include 1 combiner. A signal output from a combiner of the last layer (i.e., a final combiner) may be referred to as an integrated signal. The integrated signal is transferred to a measurement device 230 via a cable 240. As power of radiated signals of respective antenna elements of the antenna array is combined, one integrated RF signal may be obtained by combining power for RF signals of the respective combiners.

The test board 120 is connected to the measurement device 230 via the cable 240, through which the RF signal is conducted. The RF signal may be a test signal. The measurement device 230 may determine a quality indicator of the RFIC 125 by measuring the RF signal conducted via the cable 240. As such, measuring the quality of the RFIC 125 via the cable 240 may be referred to as an RFIC conduction test.

As described above, by conducting an RF signal via a cable and a test board including combiners instead of having a radiating antenna, constraints on an antenna design may be solved while providing a short test environment.

Figure 2B:
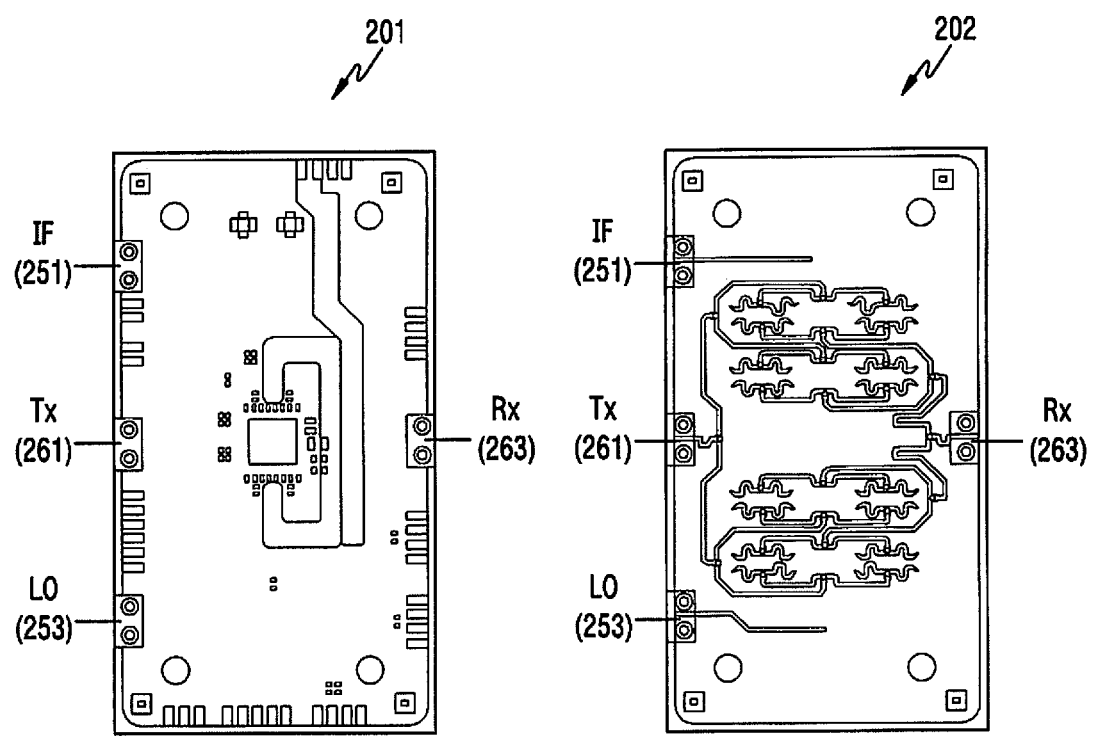
FIG. 2B illustrates a cross section of a test board for quality measurement of an RFIC according to an embodiment.

FIG. 2B illustrates a cross section of a test board for a quality measurement of an RFIC according to an embodiment.

Referring to FIG. 2B, a first surface 201 is a top surface of the test board 120. A second surface 202 is an under surface of the test board 120. Each of the first surface 201 and the second surface 202 of the test board 120 include an IF terminal 251 that inputs or outputs an IF signal, an LO terminal 253 that provides a reference frequency for frequency conversion, a transmission (TX) terminal 261 that outputs an RF signal, and a reception (RX) terminal 263 to which an RF signal is input. Each terminal may be connected by a transmission line between surfaces (e.g., the top surface and the under surface) facing each other. The second surface 202 may include a plurality of combiners to be connected to an RFIC. A combiner set for transmission and a combiner set for reception may be independently embedded in the second surface 202 of the test board 120.

An RF signal may be generated via an IF signal input via the IF terminal 251 and a reference frequency input via the LO terminal 253. The RF signal may pass through each combiner and may be output via the TX terminal 261. The RF signal received via the RX terminal 263 may pass through each combiner, which functions as a distributor, and the passed signal may be down-converted to an IF signal via a reference frequency that is input via the LO terminal 253.

Figure 3:
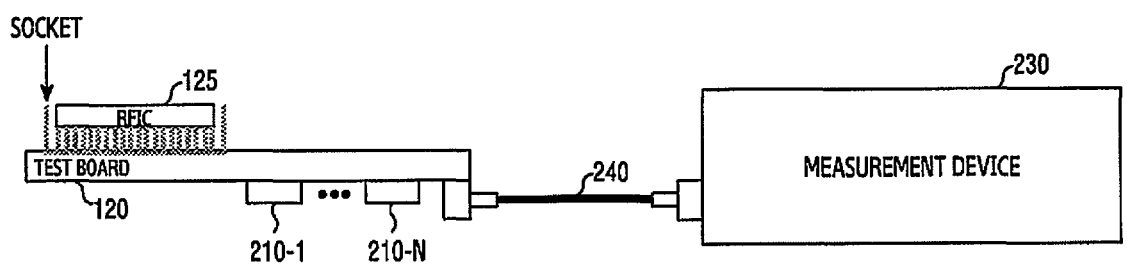
FIG. 3 illustrates a quality measurement of an RFIC according to an embodiment.

FIG. 3 illustrates a quality measurement of an RFIC according to an embodiment.

Referring to FIG. 3, a test board 120 includes a socket through which the RFIC 125 is mounted on the test board 120. The test board 120 includes a plurality of combiners 201-1 to 201-N. The plurality of combiners 210-1 to 210-N may be embedded in the test board 120. Each combiner may be coupled to an RF chain of the RFIC to be mounted. For example, a 2-in-1 combiner may be coupled to two RF chains.

The RF signal may be transferred to the test board 120 via the RFIC 125. The RF signal may be transferred to the test board 120 via each RF chain. The combiner of the test board 120 may combine each RF signal so as to form an integrated signal. Specifically, via the combiners of the test board 120, a plurality of RF signals may be combined step by step, until finally one integrated signal is generated. As power of radiated signals of respective antenna elements of an antenna array is combined, power for the RF signals of the combiners may be combined, respectively.

The test board 120 is coupled to the measurement device 230 via the cable 240. The generated integrated signal may be conducted via the cable 240. The measurement device 230 may measure a quality for the integrated signal. Each combiner designed on the test board 120 may combine the plurality of RF chains of the RFIC, i.e., power of a multi-chain. The measurement device 230 may measure the combined power. If the cable 240 of FIG. 3 is used, no antenna is required when measurement is performed, and an environment is not a wireless environment, so that the test system does not require a radiation distance. That is, a predetermined distance for a far-field is not necessary, thereby simplifying an environment for the measurement. When performance for a plurality of chips is to be measured concurrently, a required space is not increased by a multiple of a far-field distance, and it is possible to measure a plurality of chips if a space having the size as large as the test board is secured, so that an efficient test system environment may be established.

Figure 4:
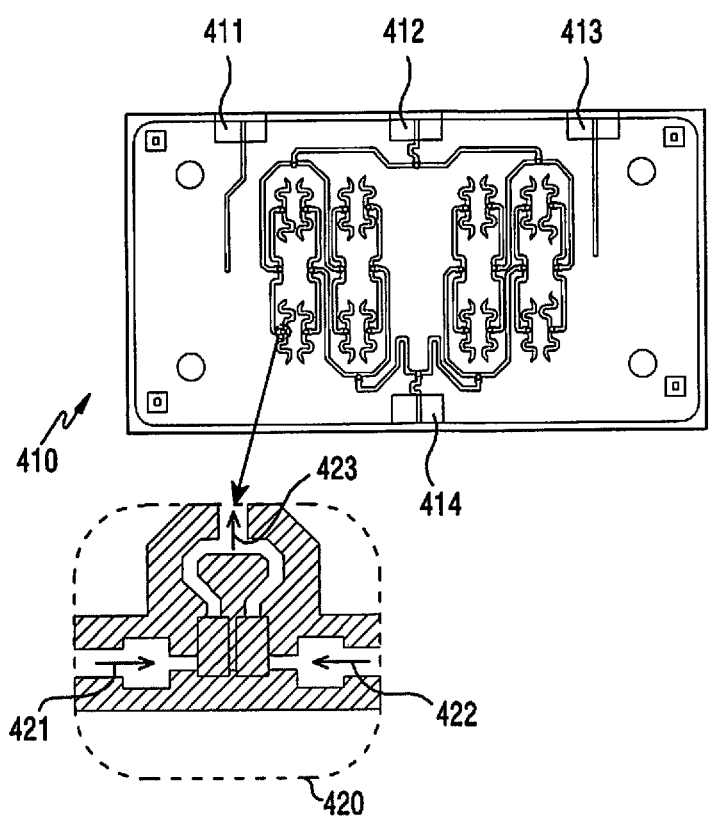
FIG. 4 illustrates a combiner for a quality measurement of an RFIC according to an embodiment.

FIG. 4 illustrates a combiner for a quality measurement of an RFIC according to an embodiment.

Referring to FIG. 4, the test board 120 includes an IF terminal 411, a TX terminal 412, an LO terminal 413, and a reception terminal 414. The test board 120 may include a combiner set including 30 combiners. The 30 combiners may be implemented on the test board 120. The 30 combiners may include 15 transmission combiners and 15 reception combiners. Each of the transmission combiners and reception combiners may have a hierarchical structure including four stages. When describing the transmission combiners, a first layer may include 8 transmission combiners, a second layer may include 4 transmission combiners, a third layer may include 2 transmission combiners, and a fourth layer may include 1 transmission combiner.

The combiner included in the first layer may be a combiner 420 having a 2-in-1 structure. The combiner 420 may combine a first RF signal 421 and a second RF signal 422, so as to generate and output one RF integrated signal 423. The combiner may combine power of the first RF signal 421 and power of the second RF signal 422, so as to generate and output an RF integrated signal 423. The combiner 420 may include a passive element. The first RF signal 421 and the second RF signal 422 may pass through respective transmission lines, and may be input to the combiner 420. The combiner 420 may include transmission lines (e.g., microstrip lines) in which signals are combined into one signal. The combiner 420 may output the RF integrated signal 423 via the transmission lines.

Figure 5:
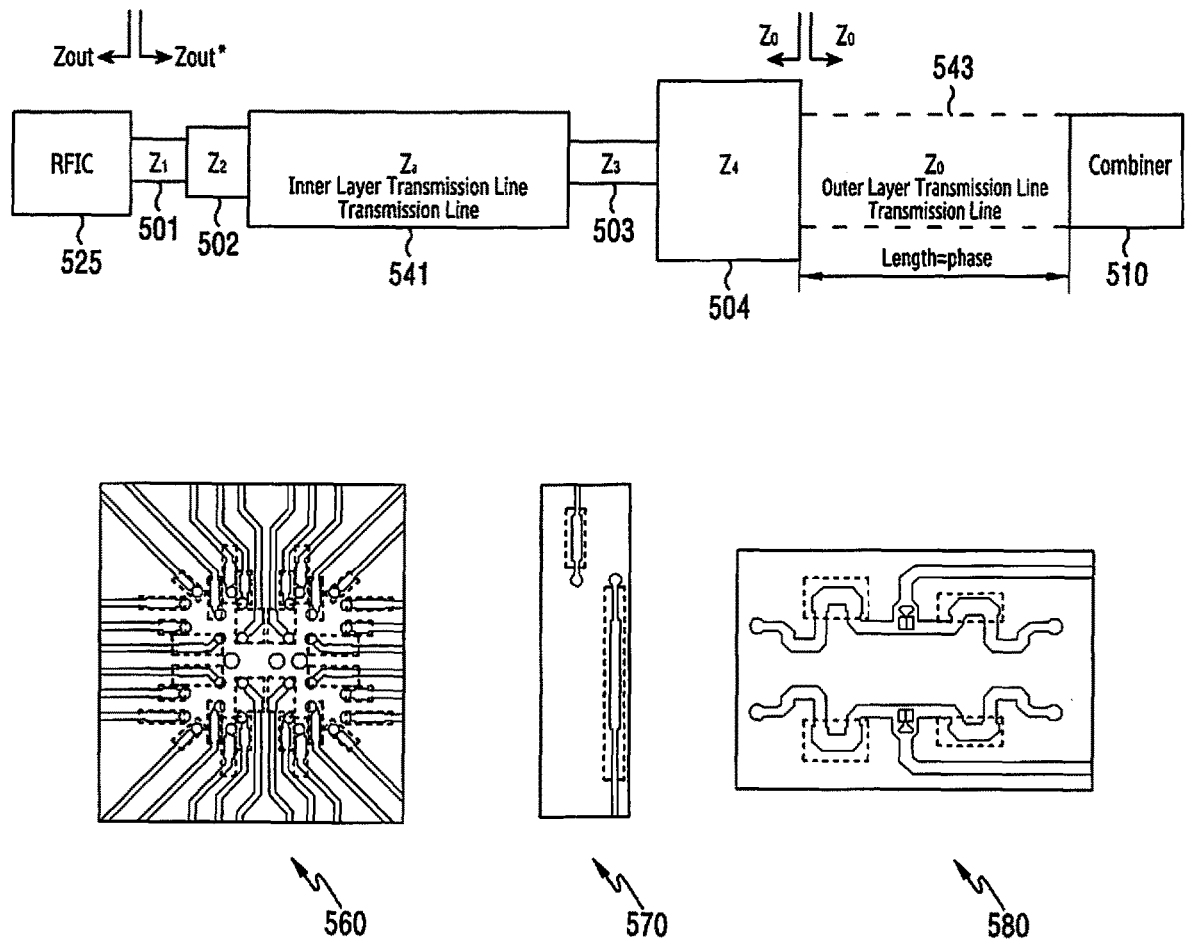
FIG. 5 illustrates controlling a transmission line for a quality measurement of an RFIC according to an embodiment.

FIG. 5 illustrates controlling a transmission line for a quality measurement of an RFIC according to an embodiment. A combiner of a test board and an RFIC may be connected by the transmission line, which may be implemented with copper.

Referring to FIG. 5, a transmission line from an RFIC 525 to a combiner 510 includes a first line 501 (Z1), a second line 502 (Z2), an inner layer transmission line 541 (Za), and a third line 503 (Z3), a fourth line 504 (Z4), and an outer layer transmission line 543 (Z0).

In a printed circuit board (PCB) inner layer, RF matching, IF matching, or LO matching may be performed by adjusting a length or thickness of the transmission line, wherein the matching is impedance matching, and an influence due to reflection by an impedance difference of connection ends is reduced via the matching operation. For example, as a thickness of the transmission line is changed in a cross section 560, RF matching with respect to the RFIC 525 may be performed. A part in which the thickness of the transmission line is different in the cross section 560 corresponds to the first line 501 (Z1) and the second line 502 (Z2). By adjusting at least one of the length or thickness of at least one of the first line 501 (Z1) or the second line 502 (Z2), RF matching may be performed for each chain. Likewise, IF matching or LO matching is performed by adjusting the thickness or length of the transmission line as shown in a cross section 570.

In a PCB outer layer, phase compensation may be performed by adjusting the length or thickness of the transmission line. The length of the transmission line of the outer layer may refer to a phase. That is, the length of the outer layer transmission line 543 (Z0) is proportional to the phase. Therefore, if phases between respective RF chains are different, a phase difference is compensated for by designing transmission lines having different lengths.

Referring to a cross section 580, the combiner 510 may combine RF signals in a state where a phase difference between two RF signals is compensated for. It may be determined that the length and thickness of the transmission line connected to each combiner are different. When each transmission path has a different length, phase mismatch between respective chains may be compensated for.

Figure 6:
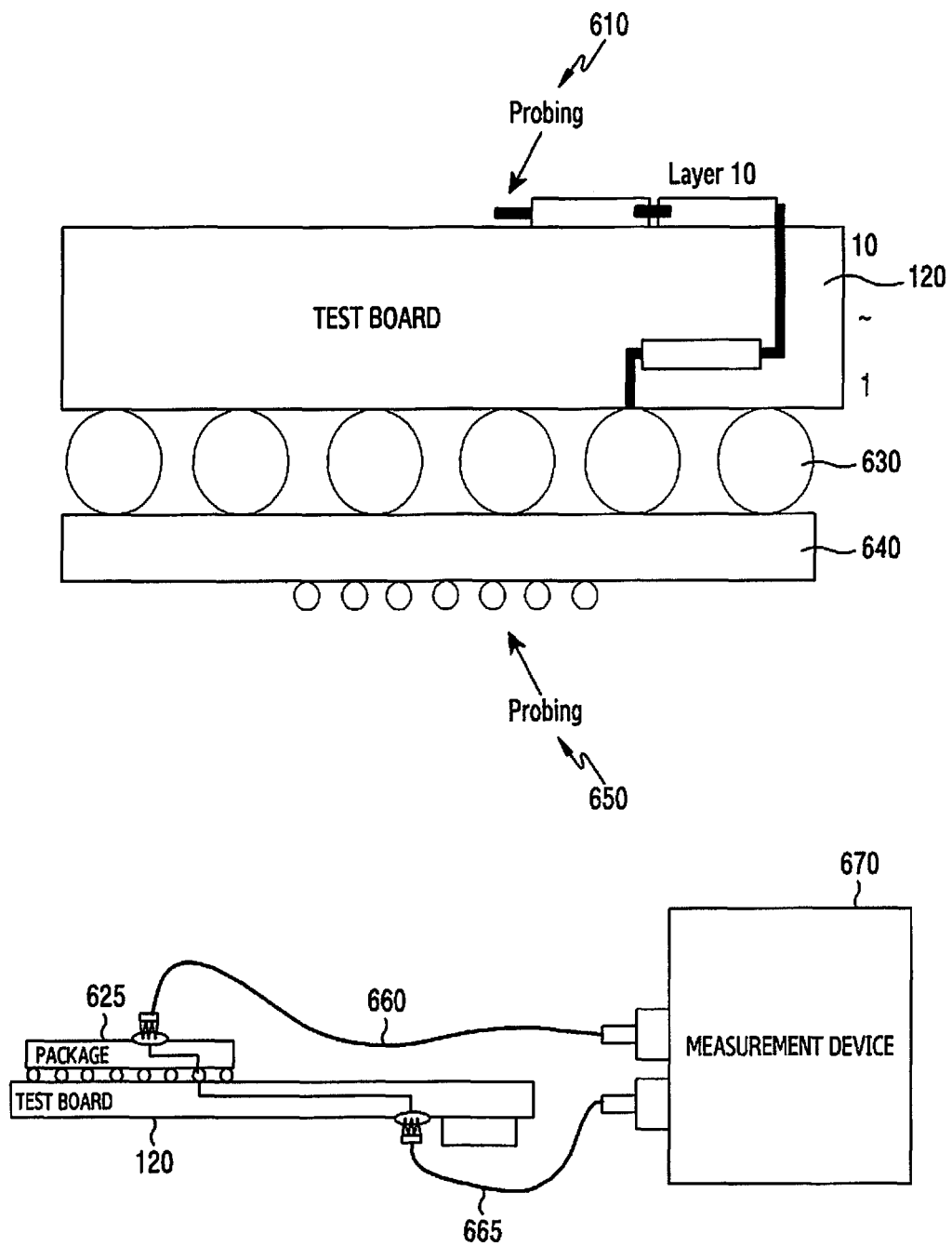
FIG. 6 illustrates loss (insertion loss) compensation of a test board according to an embodiment.

FIG. 6 illustrates loss compensation of a test board according to an embodiment. Herein, a loss may be referred to as an insertion loss (IL). Specifically, FIG. 6 illustrates a situation in which a probing operation is performed on a package substrate according to a ball grid array (BGA).

Referring to FIG. 6, probing 610 may be performed. The test board 120 includes 10 layers. The probing 610 is applied to a 10th layer, i.e., a last layer. The test board 120 is coupled to a package substrate 640 by a ball grid array 630. The package substrate 640 may refer to a thin plate on which electrical components, such as an integrated circuit, a resistor, or a switch, are soldered. The package substrate 640 may electrically connect an RFIC to be mounted and the test board. Probing 650 may also be applied to the package substrate 640. Specifically, a measurement device 670 may be coupled to a package 625 and the test board 120 via a cable 660 and a cable 665. The package 625 may correspond to the package substrate 640. The measurement device 670 may acquire an insertion loss for each chain via probing. The measurement device 670 may acquire an average insertion loss for all RF chains. Information related to the insertion loss by the measurement device 670 may be used for compensation after a quality measurement for the RFIC.

Figure 7:
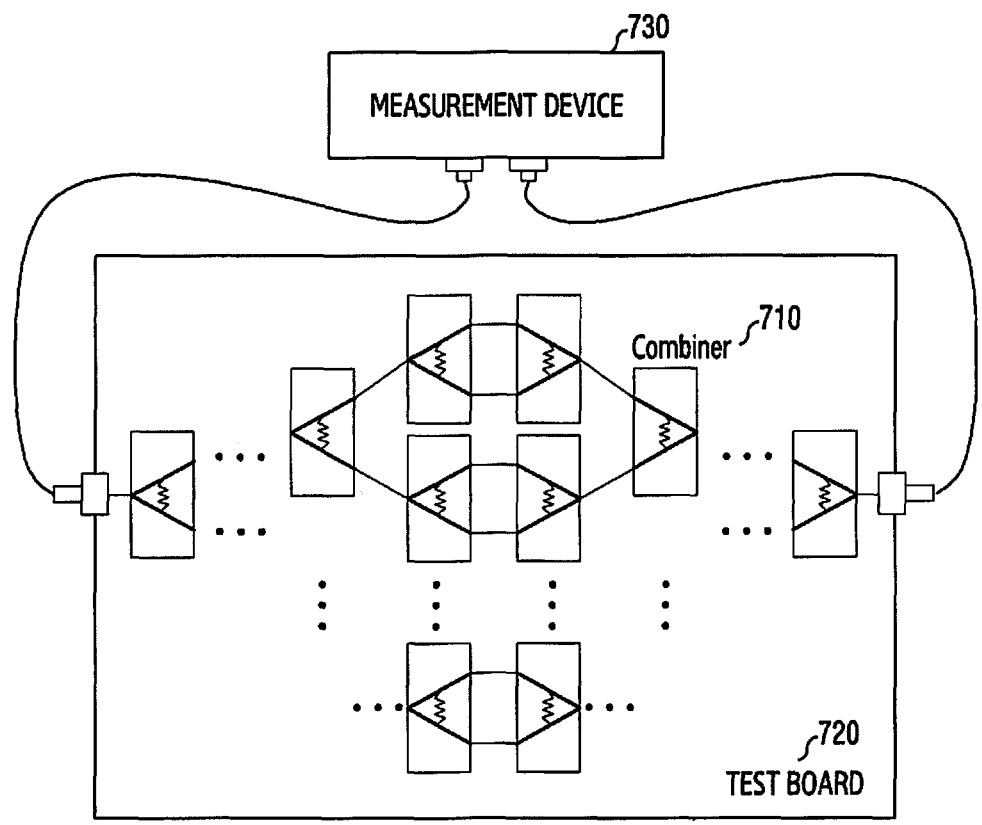
FIG. 7 illustrates loss compensation of a test board according to an embodiment.
Figure 7:
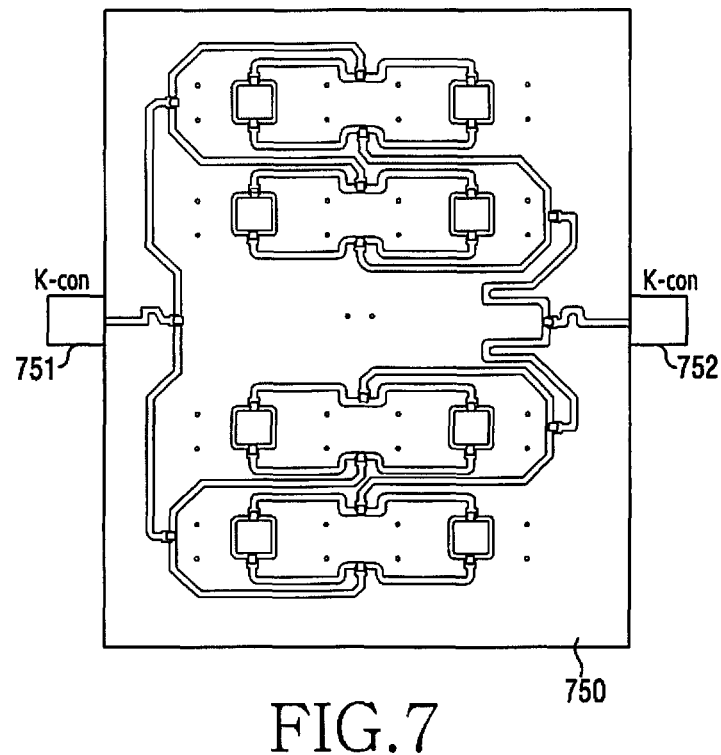

FIG. 7 illustrates loss compensation of a test board according to an embodiment.

Referring to FIG. 7, a test board 720 includes a plurality of combiners 710. The plurality of combiners 710 may include twice as many combiners as the combiners of the combiner set 210 of FIG. 2A. Cables may be connected to both ends of the test board 720. The test board 720 is connected to a measurement device 730 via each cable on both sides. Performance of the test board 720 may be measured via the measurement device 730. A back-to-back pattern may be measured via the measurement device 730.

The test board 720 may be for measuring the back-to-back pattern. Unlike the test board 120 of FIG. 2A, the test board 720 includes a combiner set symmetrical with the existing combiner set 210. The test board 720 may include a combiner set based on the same process as that for the combiner set 210 of the test board 120. The test board 720 may be generated by combining, twice, the combiner set based on the same process as that for the combiner set 210 of the test board 120.

As illustrated in FIG. 7, combiner sets may be disposed symmetrically. Instead of each RF chain terminal of the RFIC, the combiner sets are interconnected so that the back-to-back pattern may be measured. Here, the back-to-back pattern may refer to a pattern of a product, which is measured via a back-to-back test performed by reversely connecting the same product.

Referring to a cross section 750, ends of each of the combiners may be coupled to each other. Connection units 751 and 752 of each test board may be connected to the measurement device 730 by a cable.

Information relating to a loss (hereinafter, loss information) for a multi-chain combiner may be acquired via the test board 720. For example, loss information may be acquired by dividing, in half, a parameter measured by the measurement device 730 connected to the test board 720. Loss information may be stored in a memory of a device constituting a test system. A measurement device (e.g., the measurement device 130 of FIG. 1) may include a memory that stores loss information acquired via a corresponding test board.

A device performing a test (e.g., the measurement device 130 or the control unit 150 of FIG. 1) may compensate for a quality index of an RFIC via previously acquired loss information. By compensating for loss information, more sophisticated RFIC quality measurements are possible. That is, a loss may be compensated for by determining a quality index for the RFIC via the test board 120 and then post-processing the acquired loss information. Such a loss may vary at each temperature. By measuring a back-to-back pattern via the test board 720 at different temperatures, information to be compensated for at each temperature may be acquired. The loss at the test board 120 may be compensated for by determining a quality index for the RFIC via the test board 120 and then post-processing the loss information corresponding to current temperature. Further, it is unnecessary to secure a radiation distance, so that a test, such as measuring performance at each temperature, may be performed even with a small chamber.

Figure 8:
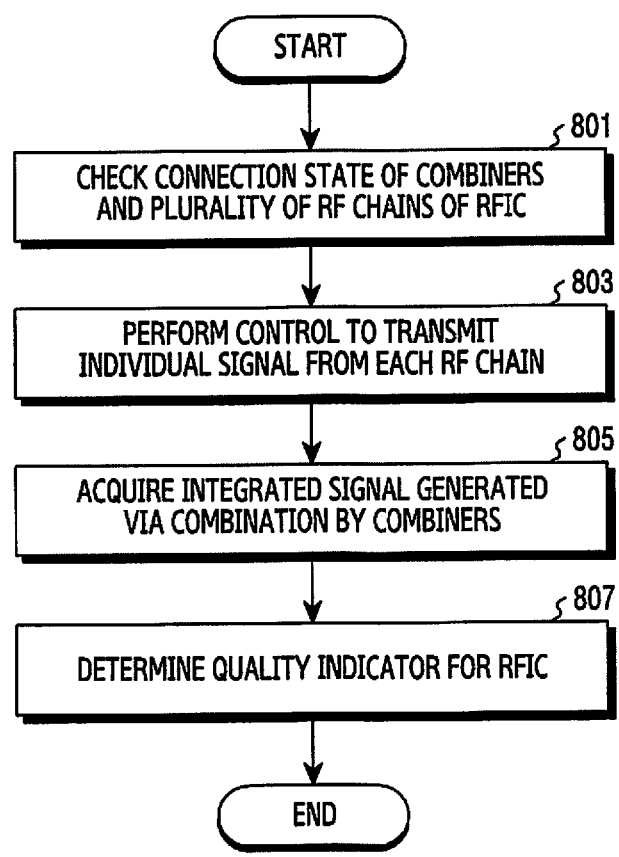
FIG. 8 is a flowchart illustrating a method of an electronic device for performing a quality measurement of an RFIC according to an embodiment.

FIG. 8 is a flowchart illustrated a method of an electronic device for performing a quality measurement of an RFIC according to an embodiment.

The electronic device may include the signal generator 110, the test board 120, the spectrum analyzer 130, and the LO 140, which are respective elements to implement the test environment 100 of FIG. 1, may include the control unit 150 implemented in software to control each device according to the test environment 100 of FIG. 1, or may include at least one of the signal generator 110, the test board 120, the spectrum analyzer 130, the LO 140, or the control unit 150. The electronic device may test performance of an RFIC via connection to the RFIC.

Referring to FIG. 8, in step 801, the electronic device checks a connection state of a plurality of RF chains of an RFIC and combiners. The electronic device may identify that the RFIC is mounted, and thus the RFIC is coupled to the combiners. If the RFIC is mounted on the test board, the combiners may be disposed on the test board so that RF chains of the RFIC are coupled to the respective combiners.

In step 803, the electronic device controls each RF chain to output an individual test signal. The electronic device may generate a test signal via the signal generator. The generated test signal may be up-converted via the RFIC and then output.

In step 805, the electronic device acquires an integrated signal generated via combination by the combiners. The electronic device may combine RF signals in the respective RF chains in order to generate an integrated signal. The electronic device may perform stepwise coupling via combiners having a hierarchical structure including a plurality of layers, in order to finally acquire an integrated signal in which RF signals of all the respective RF chains are combined.

In step 807, the electronic device determines a quality index for the RFIC. The electronic device may determine the quality indicator for the RFIC based on the integrated signal. The electronic device may measure an EVM of the RFIC. Further, the electronic device may perform a 2-tone test on the RFIC. The electronic device may measure performance associated with harmonics and linearity via the 2-tone test.

Although a measurement of transmission performance of an RFIC is illustrated in FIG. 8, the disclosure is not limited thereto. For example, a test method may also relate to reception performance of the RFIC. Similar to measurement of transmission performance, the electronic device checks a connection state of the combiners and the plurality of RF chains of the RFIC, transfers RF signals received via the combiners to the RFIC, and determines reception performance of the RFIC based on a measurement device connected to the RFIC. According to the above-described embodiments, a test method, a test system 100, a test board 120, and a test device (e.g., the control unit 150) may allow measurement of a quality of an RFIC without using a radiating antenna for measurement, and compensation for a phase mismatch between respective RF chains or loss in the system.

In the disclosure, a combiner is used while transmitting an RF signal and measuring performance thereof, but the combiner may also perform other functions according to a flow of the signal, as a passive element for combination of signals. A passive element performing a combiner function may be referred to as a coupler, a divider, a splitter, a diverter, a combiner, etc. That is, in order to measure transmission performance of the RFIC, the passive elements may be described as a combiner. However, this description implies that the passive element of a test board performs a combiner function, and does not exclude a function of the passive element, as another function (e.g., a divider).

Figure 9A:
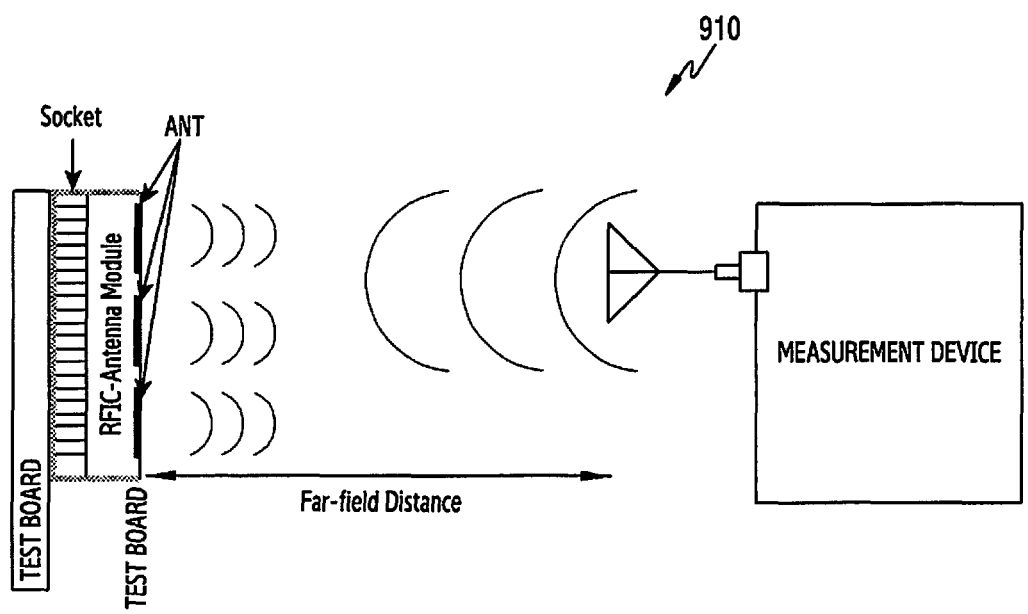
FIGS. 9A, 9B, and 9C each illustrate test environments for a quality measurement of an RFIC according to an embodiment.
Figure 9B:
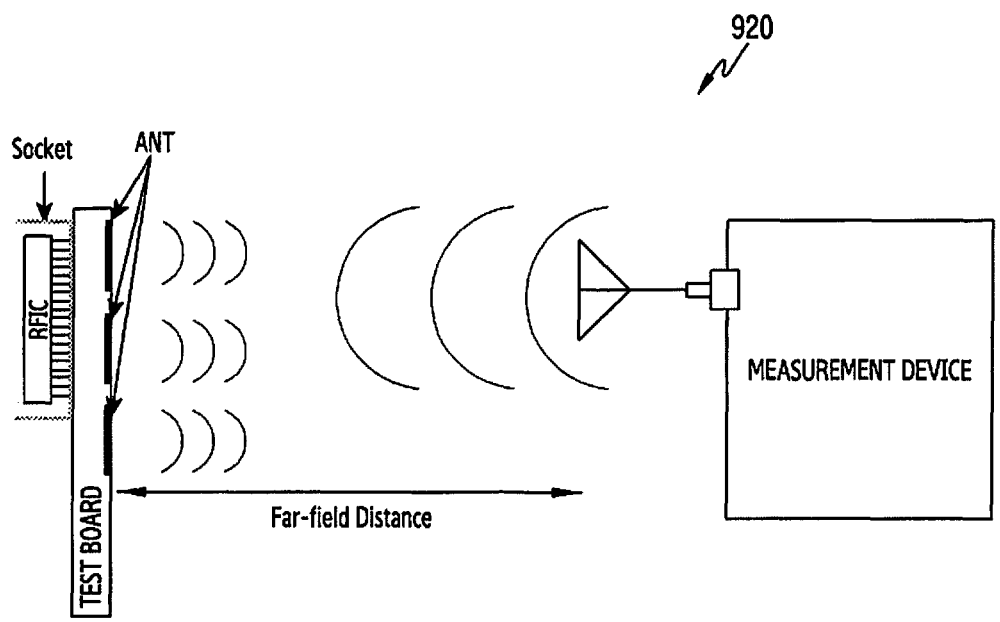
Figure 9C:
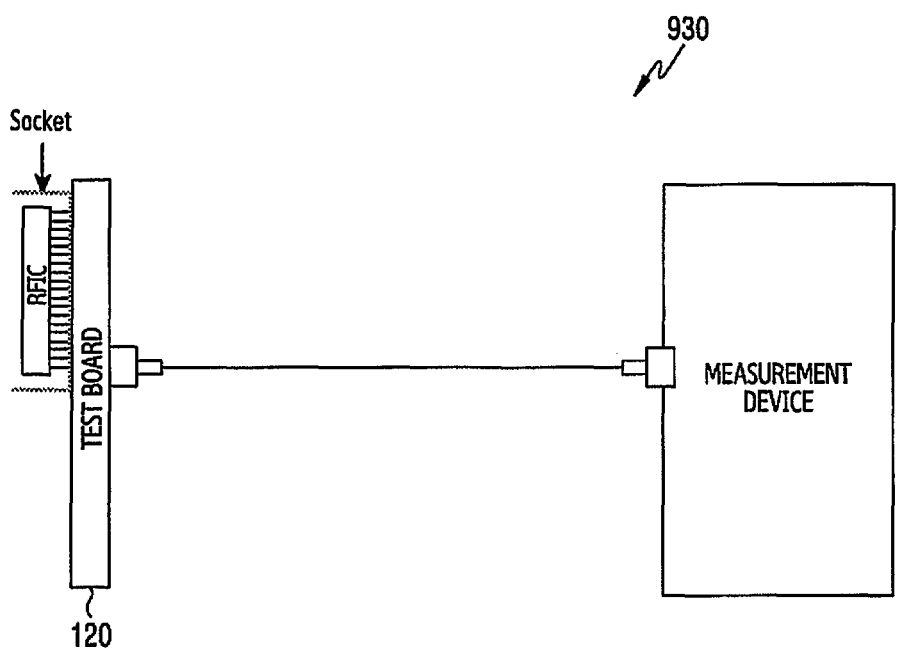

FIGS. 9A, 9B, and 9C each illustrate test environments for a quality measurement of an RFIC according to an embodiment.

Specifically, FIG. 9A illustrates an RFIC performance measurement using a radiating antenna.

Referring to FIG. 9A, an RFIC and an antenna are implemented as one module, and a predetermined distance is maintained when radiation performance of the antenna is measured. A far-field condition is required to be satisfied for performance measurement. The far-field condition requires a distance between a transmission device and a reception device to be more than a predetermined distance to form a far-field. The far-field may be an area in which a radiation pattern is constant and approximated by plane waves. The predetermined distance may be defined as shown in Equation (1) below.

$$R_{ff} = \frac{2D^2}{\lambda} \quad (1)$$

In Equation (1), $R_{ff}$ is a predetermined distance, D is a size of an antenna, and X is a length of a wavelength. For radiation over a wireless channel, a predetermined distance condition is required, which creates space constraints in a test environment. When radiation performance is measured, if a quality of a test signal does not meet requirements, it may be difficult to accurately distinguish whether a problem is caused by an antenna or an RFIC.

FIG. 9B illustrates a performance measurement of an RFIC when an RFIC and an antenna are separated. A separate antenna may be implemented on a test board on which an RFIC is mounted. That is, unlike FIG. 9A, the RFIC and the antenna are not directly coupled to be implemented as a single module, but the RFIC may be attachable to/detachable from the test board and the antenna may be implemented on the test board.

When radiation performance is measured, if a quality of a test signal does not meet requirements, whether a problem is caused by the RFIC or the antenna may be more accurately distinguished via the test board. By implementing already verified antenna arrays on the test board, performance for the RFIC may be measured. In the test board, a connection unit (referred as connector) coupled to the RFIC may include a terminal and a transmission line in which a plurality of RF chains of the RFIC are disposed to be connected to respective antennas implemented on the test board.

FIG. 9C illustrates an RFIC performance measurement via a conductive configuration when an RFIC and an antenna are separated.

Unlike FIGS. 9A and 9B, an RF signal is conducted by wire instead of wirelessly, so that it is unnecessary to meet a far-field condition. Unlike the conventional necessity of securing a distance of several tens of centimeters (e.g., about 50 cm) due to necessity of securing a radiation distance, a test device of several centimeters (e.g., about 5 cm) may be implemented by performing a test through a conductive configuration. When the RFIC and the antenna are separated, it is possible to perform more sophisticated performance measurement for the RFIC. Cables and the test board including combiners enable a conduction test, so that a simplified test environment may be provided while an accurate RFIC quality indicator is determined.

The above-described embodiments provide methods to independently test performance of an RFIC supporting a 5G communication system, without an array antenna for measurement, by performing a conduction test via cables and a test board including combiners, instead of a test via antenna radiation. Although an RFIC includes a plurality of RF chains in order to be coupled to a 5G phased antenna array, a test board including combiners is used instead of antennas when performance is tested, so that the test method of the disclosure provides a reduction in time and space costs for configuring a measurement environment in comparison with a conventional measurement scheme. Further, the test method may provide simplification of the overall test system. In addition, the above-described embodiments solve a phase mismatch between chains via a design of a transmission line, while providing accurate measurement of RFIC performance, by accurately compensating for a loss in each chain via probing and a back-to-back test.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access a device that performs an embodiment via an external port. Further, a separate storage device on the communication network may access a portable electronic device.

In the above-described detailed embodiments, a component included in the disclosure is expressed in the singular or the plural according to a presented detailed embodiment. However, the singular form or plural form is selected for convenience of description suitable for the presented situation, and various embodiments are not limited to a single element or multiple elements thereof. Further, either multiple elements expressed in the description may be configured into a single element or a single element in the description may be configured into multiple elements. Further, either multiple elements expressed in the description may be configured into a single element or a single element in the description may be configured into multiple elements.

A device and method according to the above-described embodiments provide, in a mass production stage, achievement of a high efficiency during a measurement test, by measuring performance of an RFIC without configuring an antenna for measurement.

Effects that can be acquired by the disclosure are not limited to the above-described effects, and other effects that have not been mentioned may be clearly understood by those skilled in the art from the following description.

While the disclosure has been shown and described with reference to certain embodiments thereof, it will be understood by those skilled in the art that various changes in form and details may be made therein without departing from the scope of the disclosure as defined by the following claims and their equivalents.

What is claimed is:

1. A test board in a wireless communication system, the test board comprising:
   a socket for coupling with a radio frequency integrated circuit (RFIC);
   a connector for coupling with a spectrum analysis device;
   at least one combiner configured to combine radio frequency (RF) signals; and
   a plurality of transmission lines configured to connect the at least one combiner and a plurality of RF chains,
   wherein a plurality of input ends of the at least one combiner are usable for coupling with the plurality of the RF chains of the RFIC, respectively, and
   wherein lengths of the plurality of transmission lines connected to the at least one combiner are determined based on phase differences of the plurality of the RF chains, respectively.

2. The test board of claim 1, wherein each of the at least one combiner comprises at least two input ends and one output end, and a number of the plurality of the RF chains is less than or equal to a number of the input ends.

3. The test board of claim 1, wherein the connector provides a wired connection via a cable.

4. The test board of claim 1, wherein each of the at least one combiner comprises at least one passive element, and
   wherein the at least one combiner transfers RF reception signals to the RFIC by distributing an input RF signal.

5. A method for testing a radio frequency integrated circuit (RFIC), performance in a wireless communication system, the method comprising:
   checking a connection state of least one combiner and a plurality of radio frequency (RF) chains of an RFIC which is mounted on a test board;
   performing control to output RF signals from the plurality of the RF chains;
   acquiring an integrated signal by combining the RF signals, via the at least one combiner; and
   determining a quality indicator for the RFIC based on the integrated signal,
   wherein the test board includes the at least one combiner, and
   wherein input ends of the at least one combiner are coupled to the plurality of the RF chains.

6. The method of claim 5, wherein the quality indicator for the RFIC comprises at least one of error vector magnitude (EVM), gain, noise figure, and linearity.

7. The method of claim 5, wherein performing control to output the RF signals comprises:
   generating intermediate frequency (IF) signals; and
   performing control to up-convert the IF signals using RFIC mixers.

8. The method of claim 5, further comprising:
   acquiring information related to an insertion loss via probing; and
   compensating the quality indicator for the RFIC based on the acquired information.

9. The method of claim 5, further comprising:
   measuring a loss via a back-to-back test board including first combiners and second combiners of the at least one combiner; and
   compensating the quality indicator for the RFIC based on the measured loss,
   wherein input ends of the first combiners and input ends of the second combiners are symmetrically coupled to each other in the back-to-back test board.

10. The method of claim 5, further comprising:
    performing control to output an RF reception signal;
    receiving the RF reception signal via the elements; and
    determining a reception quality indicator for the RFIC based on the received RF reception signal,
    wherein each of the elements comprises at least one passive element, and
    wherein the elements operate as dividers.

11. An electronic device in a wireless communication system, the electronic device comprising:
    at least one processor configured to:
    check a connection state of at least one combiner and a plurality of radio frequency (RF) chains of a radio frequency integrated circuit (RFIC) which is mounted on a test board;
    perform control to output RF signals from the plurality of the RF chains;
    acquire an integrated signal by combining the RF signals via the at least one combiner; and
    determine a quality indicator for the RFIC based on the integrated signal,
    wherein the test board includes the at least one combiner, and
    wherein input ends of the at least one combiner are coupled to the plurality of the RF chains.

12. The electronic device of claim 11, wherein the quality indicator for the RFIC comprises at least one of error vector magnitude (EVM), gain, noise figure, and linearity.

13. The electronic device of claim 11, wherein the at least one processor, in order to perform control to output the RF signals, is further configured to:
    generate intermediate frequency (IF) signals; and
    perform control to up-convert the IF signals by means of RFIC mixers.

14. The electronic device of claim 11, wherein the at least one processor is further configured to:

acquire information relating to an insertion loss via probing; and compensate for the quality indicator for the RFIC based on the acquired information.

15. The electronic device of claim 11, wherein the at least one processor is further configured to:

measure a loss via a back-to-back test board including first combiners and second combiners of the at least one combiner; and compensate the quality indicator for the RFIC based on the measured loss, wherein input ends of the first combiners and input ends of the second combiners are symmetrically coupled to each other in the back-to-back test board.

16. The electronic device of claim 11, wherein the at least one processor is further configured to:

perform control to output an RF reception signal;

receive the RF reception signal via the elements; and determine a reception quality indicator for the RFIC based on the received RF reception signal, wherein each of the elements comprises at least one passive element, and wherein the elements operate as dividers.

* * * * *